United States Patent [19]
Tanihira et al.

[11] Patent Number: 5,574,514
[45] Date of Patent: Nov. 12, 1996

[54] AUDIO/VIDEO DEVICE FOR A COMMUNICATION SYSTEM

[75] Inventors: Tadahi Tanihira; Takashi Miyake; Hitoshi Fukatsu; Kouichi Sato; Tadashi Sano, all of Iwaki, Japan

[73] Assignee: Alpine Electronics, Inc., Tokyo, Japan

[21] Appl. No.: 364,161

[22] Filed: Dec. 27, 1994

[30] Foreign Application Priority Data

Dec. 27, 1993 [JP] Japan .................................. 5-330320

[51] Int. Cl.$^6$ ................................................ H04N 5/268
[52] U.S. Cl. ...................................... 348/706; 340/825.51
[58] Field of Search ..................................... 348/705, 706, 348/722; 370/85.6; 340/825.51; H04N 5/268

[56] References Cited

U.S. PATENT DOCUMENTS

| | | |
|---|---|---|
| 4,715,031 | 12/1987 | Crawford et al. . |
| 4,808,992 | 2/1989 | Beyers, Jr. et al. . |
| 5,054,022 | 10/1991 | van Steenbrugge ................... 370/85.6 |

*Primary Examiner*—Victor R. Kostak
*Attorney, Agent, or Firm*—Guy W. Shoup; Patrick T. Bever

[57] ABSTRACT

A communication system including a plurality of audio/video devices including one or more audio signal source devices and image (video) signal source devices connected to a bus, each audio/video device of a common type having a common bus address. Each audio/video device is provided with a predetermined priority value which is stored in memory. Upon power up, every device transmits a communication frame including its own address and its priority value on the bus. When two or more common-type devices (i.e., having a common address) are connected to the bus, conflict is avoided by disabling the device or devices having lower priority values. That is, when each of the common-type device receives a communication frame having the common address, the device compares the transmitted priority value with its stored priority value. If the stored priority value is less than the received priority value, the device disables itself. Conversely, when the stored priority value is greater than the received priority value, the device remains active (survives), and responds to further communication frames having the common address.

18 Claims, 18 Drawing Sheets

DA : DIRECTED ADDRESS
SA : TRANSMISSION SOURCE ADDRESS
DATA : TRANSMISSION DATA
CHECK CODE : ERROR DETECTION CODE

AUDIO/VIDEO DEVICE FOR A COMMUNICATION SYSTEM

BACKGROUND OF THE INVENTION

1. Field of the Invention

The present invention relates to a communication system including a plurality of audio/video devices, and in particular to an audio/video device for connecting to the communication system.

2. Description of the Related Art

Prior art internal communication systems suitable for use, for example, in an automobile include a plurality of audio/video devices (units) which include one or more audio signal sources (such as AM/FM tuners, cassette players and compact disk (CD) players) and/or image signal sources (such as television systems and navigation devices), a control terminal (commander) provided as a user interface and a central control unit interconnected through bus lines (communication lines) and executing communication between the units by sending command signals on the bus lines, each command signal including a transmission source address, a destination address and command information.

FIGS. 20A and 20B show prior art communication system which includes a command input terminal (commander) 1, an analog cassette player 2, an FM/AM tuner 3 and a CD changer 4 each connected to a bus line. The input terminal (commander) 1, the analog cassette player 2 and the FM/AM tuner 3 constitute a head unit (HU) 5. The head unit 5 is a minimum basic unit of a car audio system. In addition, as shown in FIG. 20A, the system includes an optional CD changer 4 connected to the bus.

In this system, an intrinsic logic address is allocated to each of the respective units. Information is transmitted to the units via the bus in discrete signal bursts, or frames, each frame including a transmission source address, a destination address and command information. When the destination address of a unit coincides with the destination address of a transmitted frame sent thereto, the unit accepts the frame and processes the frame.. For example, when an advance command is entered by a user by activating an appropriate key commanded by the key operation of the commander 1 while the CD changer 4 is being played, the commander 1 creates a frame including a transmission source address set to the address thereof, a destination address set to the address of the CD changer, and command information associating with advancing to a subsequent music selection, and then transmits the frame on the bus line. The CD changer 4 receives the frame and advances from a current music selection to the subsequent music selection and then reproduces the subsequent music selection.

Often, the above-mentioned system is upgraded by its owner to include an additional audio signal source which is of the same type as one of the originally-installed audio signal sources, but provides performance qualities which are superior to that of the original audio signal source. For example, when an FM/AM tuner used in a system has only six preset keys for presetting AM and FM channels, and a user finds this unsatisfactory, the user can connect an FM/AM tuner having a greater number of preset keys and superior performance qualities to the system. Thereby, the system includes a plurality of audio signal sources of the same type.

In an audio/video system having respective units interconnected through a bus line, each basic type of unit is assigned predetermined addresses. For example, an AM/FM tuner has an address of 20, a TV tuner has an address of 22, and an analog cassette has an address of 28.

When a system is upgraded to include a unit which is of the same type as an existing unit, a conflict arises because there are two units having the same address in the system. FIG. 20B shows a case in which an audio system is upgraded to include an FM/AM tuner 3' of better quality. Thus, there are the two FM/AM tuners 3, 3' having the same address in the system. In this case, when the commander 1 issues, for example, a channel seek command to the FM/AM tuner, both of the FM/AM tuners 3, 3' simultaneously receive the command and execute the seek operation.

When a seek operation is to be executed, the FM/AM tuner sends a receiving frequency to the commander 1 which is displayed on a display unit. Therefore, each time a receiving frequency changes, the two FM/AM tuners 3, 3' independently send the receiving frequencies to the commander, which results in the following problem. That is, because the number of displayed frequencies is doubled, each displayed frequency alternately appears on the display unit. For example, when one of the FM/AM tuners seeks upwards from 80.0 MHz and the other FM/AM tuner 3' seeks upwards from 82.5 MHz, receiving frequency data 80.1, 80.2, . . . and receiving frequency data 82.6, 82.7, . . . are alternately sent from the FM/AM tuner 3 and the FM/AM tuner 3'. As a result, the display of frequency changes at a speed twice the usual speed such as 80.1, 82.6, 80.2, 82.7, . . . so that the frequency display flickers and inconsistent frequencies are displayed.

Further, the audio signal which is transmitted on the audio line to the speakers is determined by the location of the units on the bus. That is, audio signals are transmitted serially on the bus from unit to unit until selected audio signals are connected to speakers through an output amplifier. Each unit receives an audio signal from a preceding unit and passes either the received signal or a generated signal to a subsequent unit. Each unit passes the received signal when the unit is inactive (not selected), and transmits the generated signal (blocks the received signal) when the unit is active (selected). However, when two units having the same address are active, then the audio signal generated by one of the units will be blocked by the other unit, and only audio signals from the other unit will be transmitted to the output amplifier. In this case, when the upgraded FM/AM tuner is accidentally installed such that the original tuner is located on the bus between the upgraded tuner and the amplifier, then the upgraded FM/AM tuner does not perform usefully in the system and the connection thereof must be changed, which requires a bothersome re-assembly of the system.

Although the above-mentioned example describes upgrading a system with an FM/AM tuner, the same problem arises when the system is upgraded with other units, such as an analog cassette tape player.

In view of the above-mentioned problems, the present invention provides a method of prioritizing units having the same address by which, when there are a plurality of units having the same address in a system, only one of the units (the unit having superior performance characteristics) is automatically activated and the other units are automatically deactivated, such that the audio signal from the superior performing unit is transmitted to the output amplifier.

SUMMARY OF THE INVENTION

In accordance with the present invention, a communication system for, for example, audio/video electronic devices installed in a vehicle or elsewhere includes a plurality of command input terminals, a system control unit, a plurality of electronic devices including audio signal sources (such as AM/FM tuners, cassette players and compact disc players), and image (video) signal sources (such as television receivers and navigation devices). The electronic devices, the system control unit and the commanders are interconnected through bus lines. Communication is executed between the respective units by transmitting signal (communication) frames of digital information which include a transmission source address, a destination address and transmission information (commands, data) on the bus lines.

Priority values and address data are stored in the memory of each electronic device. After the system power supply is turned on, each unit generates a signal frame including a destination address, which coincides with its stored address, and transmission information which includes the priority data. The controller then transmits the communication frame on the bus lines. Any other device whose address coincides with the destination address (i.e., a unit having the same address as that of the transmitting unit) receives the communication frame and compares the received priority data with the stored priority value. When the stored priority value of the unit is lower than the received priority value, the unit's operation is stopped, whereas when the stored priority value of the unit is higher, its operation is not stopped and the unit remains active.

Further, when the priority of one unit is higher than another, the higher-priority unit then transmits an additional communication frame having a destination address coinciding with its stored address and including the stored priority data to the bus lines so that the operation of the lower-priority unit is securely stopped. That is, even if the lower-priority unit becomes active after the power supply is turned on and the priority data of the unit having the higher priority cannot be received, the unit having the higher priority retransmits the priority data and the lower-priority unit is securely stopped.

With this arrangement, when a plurality of units having the same address are in the system, only one of the units (e.g., the unit having superior performance characteristics) is automatically given priority over other similar units, without the need for any operator manipulation, whereby the operation of the other similar units is stopped. As a result, additional units can be connected to the bus without any restriction, switches are not needed, and further various problems resulting from the presence of a plurality of units having the same address, such display flicker, can be avoided.

BRIEF DESCRIPTION OF THE DRAWINGS

FIG. 16 is a diagram showing a processing sequence when an ACC power supply is turned on;

DETAILED DESCRIPTION OF THE PREFERRED EMBODIMENTS

Figure 1A:
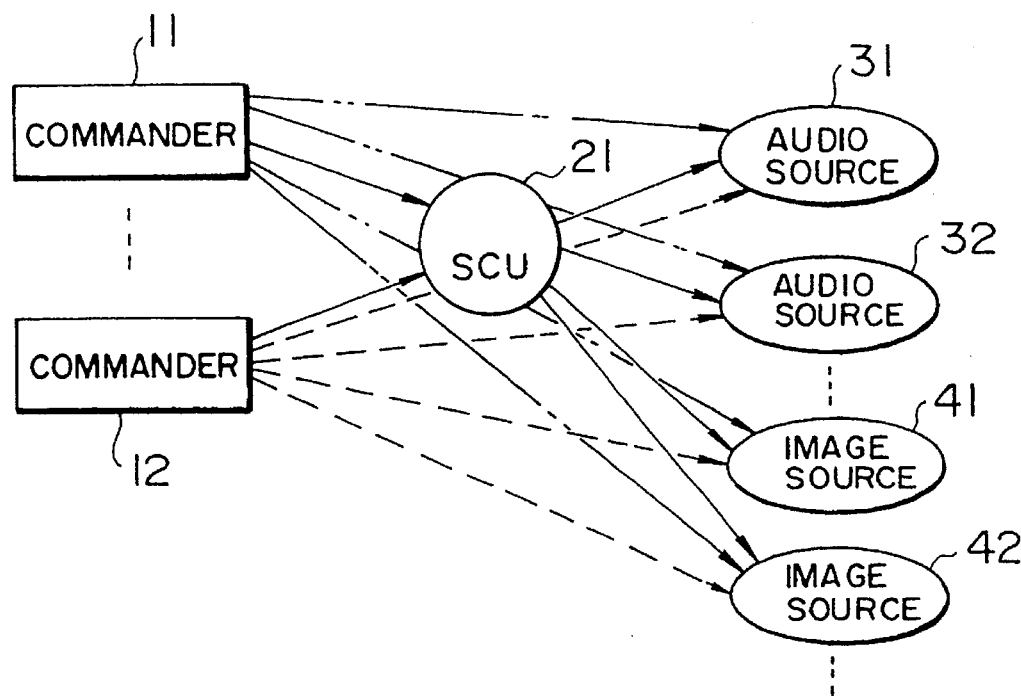
FIGS. 1A and 1B are diagrams showing operation of the present audio/video system.
Figure 1B:
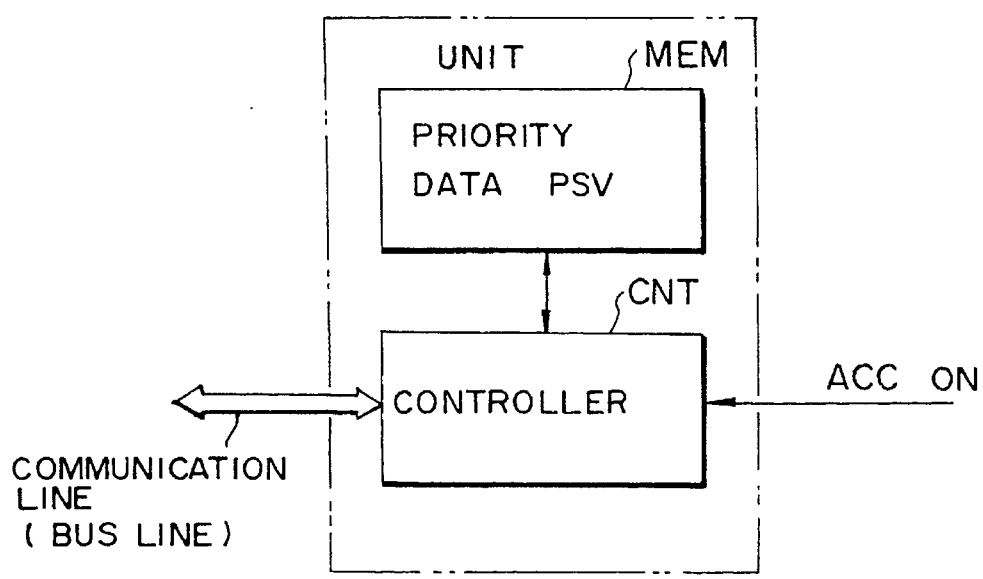

FIGS. 1A and 1B are diagrams showing operation of an audio/video communication system in accordance with the present invention.

In FIG. 1A, numerals 11 and 12 denote command input terminals (commanders) which serve as user interfaces, numeral 21 denotes a system control unit, numerals 31 and 32 denote audio signal sources (such as AM/FM tuners, cassette players and compact disc (CD) players), and numerals 41 and 42 denote image (video) signal sources (such as television receivers and navigation devices). The audio signal sources and video signal sources are interchangeably referred to herein as electronic devices and units. Further, as shown in FIG. 1B, UNT denotes respective units constituting a system, CNT denotes a controller and MEM denotes a memory unit for storing priority data PSV and address information, as described further below.

(a) Overall Arrangement of Audio/Video System

Figure 2:
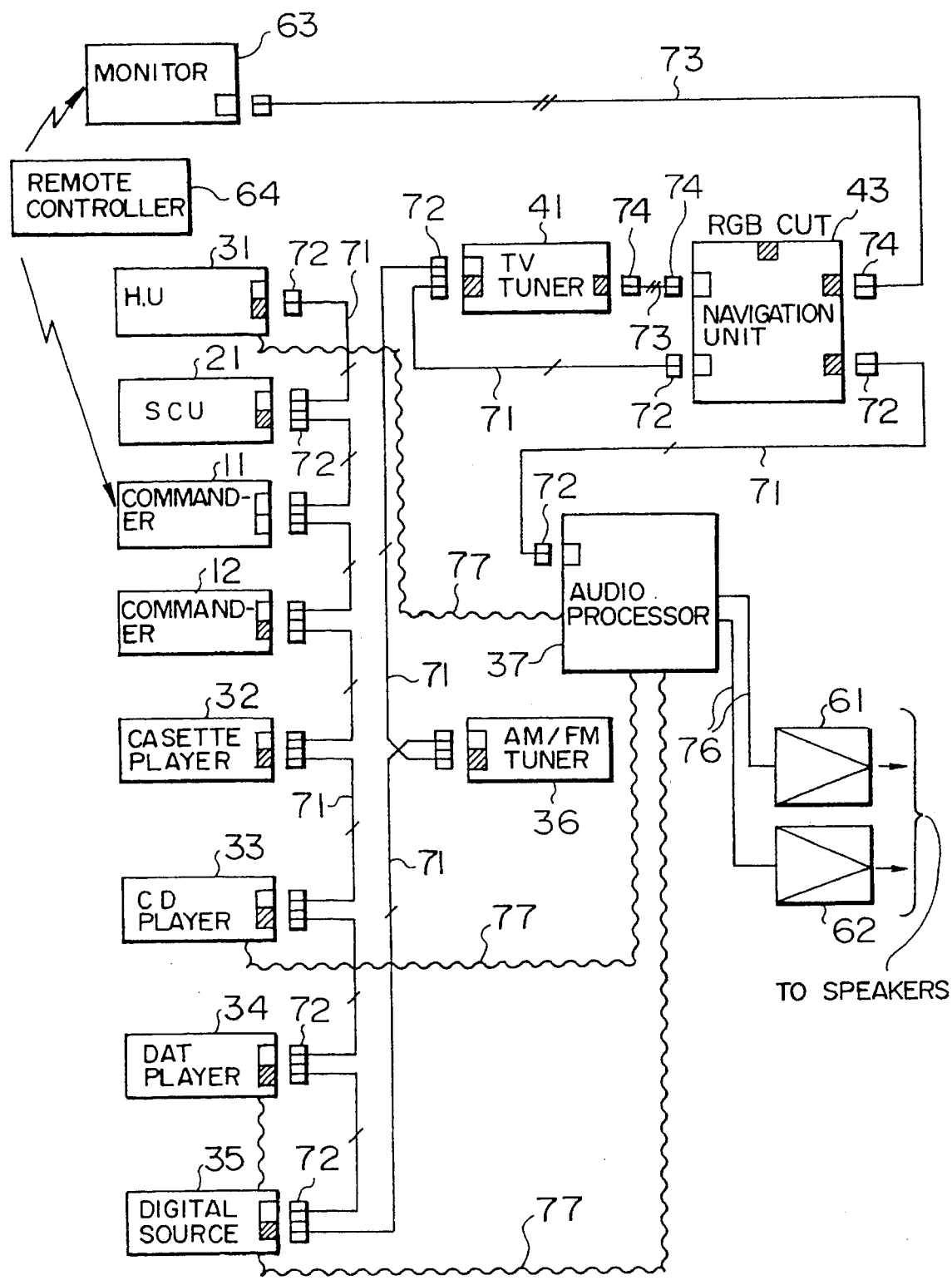
FIG. 2 is a block diagram showing the overall arrangement of the present audio/video system.

FIG. 2 is a block diagram showing the overall arrangement of an audio/video system according to the present invention which includes the system control unit (SCU) 21 as an independent unit. As described below, the system control unit 21 may be included in a head unit or a commander.

Numerals 11, 12 denote commanders (operation units) provided as user interfaces, numeral 21 denotes a system control unit (SCU) and numeral 31 denotes a head unit (HU) which includes, for example, an AM/FM tuner, a cassette tape player and a CD player as audio sources. Numeral 32 denotes an analog device (such as a cassette tape player), numeral 33 denotes the CD player, numeral 34 denotes a DAT player, numeral 35 denotes digital audio sources such as a minidisc player, a digital compact cassette (DCC) player, numeral 36 denotes the AM/FM tuner, and numeral 37 denotes an audio processor. A reason for the latter-mentioned digital audio sources, which include the formerly-mentioned audio sources of the head unit 31, is that there is sometimes a requirement to assemble an additional system having superior performance qualities to that of the audio sources included in the head unit 31. Further, the audio/video system may employ any arbitrary arrangement, and, for example, only the audio sources of the head unit may be used or the head unit may be omitted depending upon the system.

Numeral 41 denotes a TV tuner, and numeral 43 denotes a navigation system. Video sources may be arbitrarily arranged in the same way as the audio sources. For example, the system may include no image sources, the system may include only a TV tuner, or the system may include multiple image sources.

The term "audio/video" is used herein to designate either audio, video or audio and video. For example, "audio/video unit" is used herein to designate either: (i) one of the above-mentioned audio sources, (ii) one of the above-mentioned video signal sources, or (iii) a device including both an audio signal source and a video signal source.

Numerals 61, 62 denote amplifiers for amplifying audio signals and numeral 63 denotes a video monitor such as, for example, a liquid crystal display, and numeral 64 denotes a remote controller.

The memory contained in the controller of each unit connected to the bus line stores priority data PSV (refer to FIG. 1B) in order to deactivate one or more of a plurality of units having the same address such that only one of them is activated.

Numeral 71 denotes a bus (each bus being conventionally denoted by an inclined line at the center thereof) having, for example, communication lines, analog audio signal lines (L, R), and each of the bus lines has connectors 72 connected to both ends thereof. Numeral 73 denotes bus lines (denoted by two inclined lines at the center thereof) for connecting the video composite display signals of the image units. The bus lines include an image composite signal line, a remote control signal line and other lines, and each of the bus lines is provided with connectors 74 connected to both ends thereof. Numeral 76 denotes audio signal lines for transmitting analog audio signals. Numeral 77 denotes optical fibers for transferring digital data, each of the optical fibers 77 having optical connectors at the both ends thereof. An optical transmitter (electro-optical (E/O) converter) is connected to the optical connector on a transmission side and an optical receiver (opto-electronic (O/E) converter) is connected to the optical connector on a receiving side.

Figure 3A:
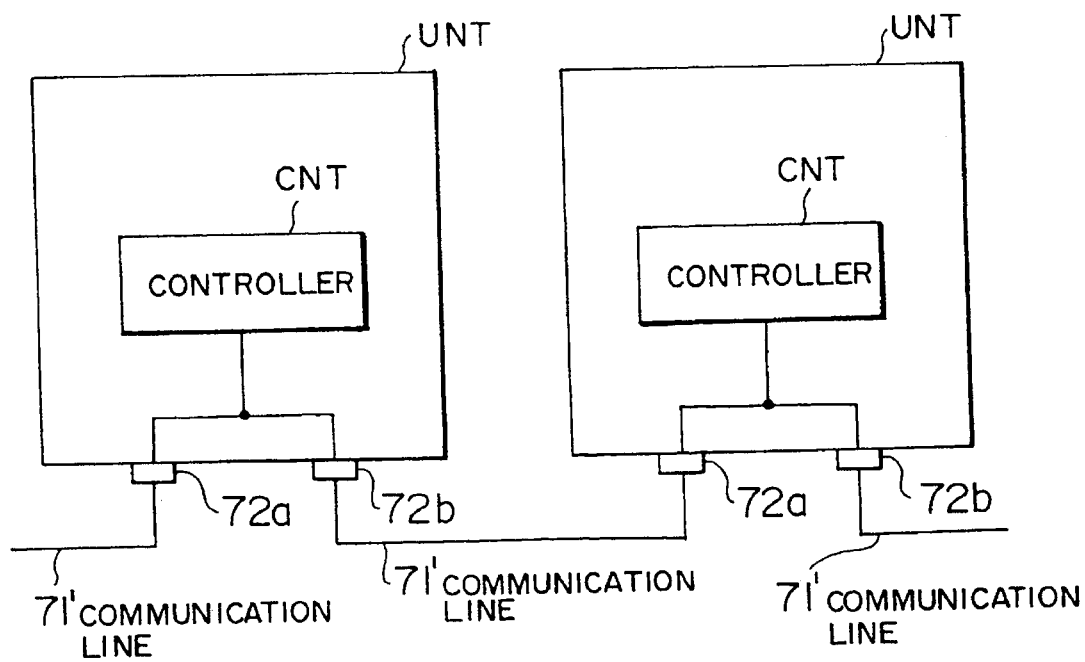
FIGS. 3A and 3B are block diagrams showing the connection between respective units.

As shown in FIG. 3A, the communication lines 71' included in the bus 71 are connected in each unit UNT in a continuous fashion as well as being connected to the controller CNT of each unit. The controller CNT receives data transmitted from other units on the communication line and executes a predetermined control in response to the received data. In addition, the controller CNT transmits data to other units on the communication line. With this arrangement, all the units interconnected through the communication lines 71' can communicate with each other. Data is transmitted bidirectionally on the communication lines.

Figure 3B:
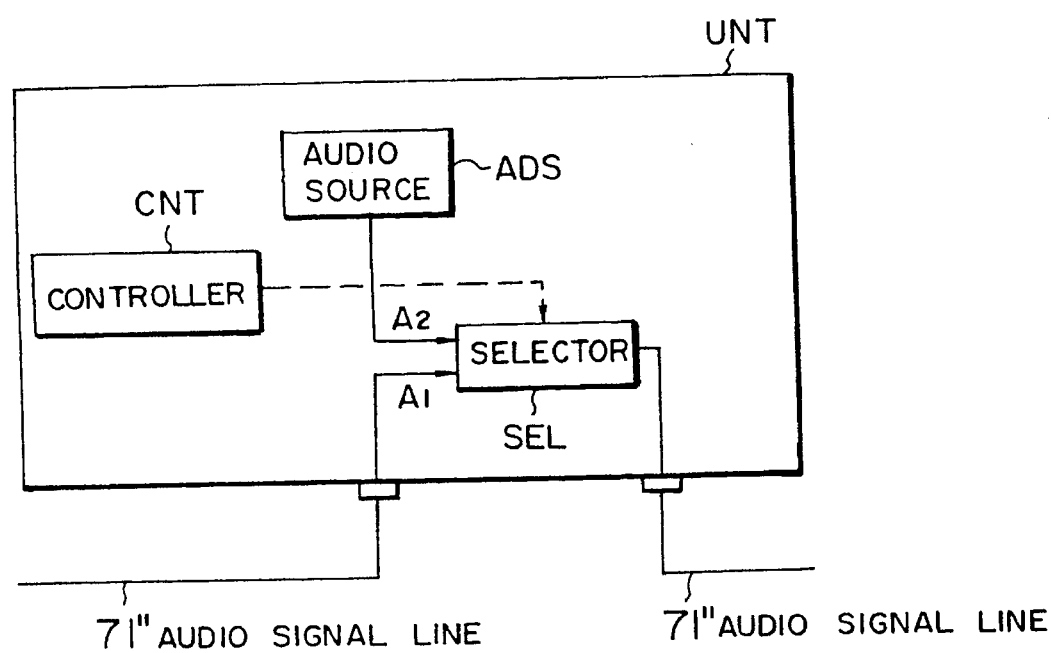

As shown in FIG. 3B, analog audio signal lines 71" are connected in a unit UNT, which contains an audio source ADS, such that a selector SEL selects either analog audio signals A1 transmitted on the audio signal line 71" from a previous unit, or audio signals A2 output from the audio source ADS according to a command from the controller CNT, and transfers the selected signals to a subsequent unit. The analog audio signal lines 71" are connected to pass, unimpeded, through units not having an audio source. Therefore, analog audio signals output from a predetermined one of the audio sources ADS reach the audio processor (AP) 37 through the analog signal lines 71". At the audio processor 37, the selected audio signals are subjected to an audio signal processing operation, and then output to the amplifiers 61, 62.

The video signal lines 73 are arranged in the same manner as the analog audio signal lines. That is, predetermined video signals are selected at each unit, and the selected video signals reach the video monitor 63 through each image unit and are displayed on a display screen.

The optical fibers 77 are connected to the audio processor either through other digital audio sources or are directly connected thereto. The audio processor 37 selects predetermined digital audio data, subjects the data to D/A conversion and outputs the converted analog data to the amplifiers 61, 62.

• Switching of Source and Command to Operation

When the system switches from one signal source to another signal source, a source switch request is sent either from one of the commanders 11, 12, . . . or from a unit to the system control unit 21, which controls the activation of the requested source and the deactivation of the currently-active source through the communication lines based on the source switch request. Operation control signals are sent to the active source directly (unchanged) from the commanders 11, 12 through the communication lines, and the active source then executes the commanded operation.

Source switching and transmission of operation commands can be executed by depressing the keys provided on the commanders as well as by the operation of the remote controller 64. A remote control signal output from the remote controller 64 is received by the remote control light receiving units disposed in the commander 11 and the video monitor 63.

On receiving the remote control signal, the commander 11 sends a predetermined command to the communication lines 71 based on a command from the remote controller, and controls the operation of each source in the same way as the command issued by the key operation.

Further, on receiving the remote control signal, the video monitor 63 sends the remote control signal to each image unit through the bus 73. Since the remote controller 64 can command the respective operations of each image unit, each image unit receives the remote control signal and executes the commanded operation.

(b) Frame Format

Figure 4:
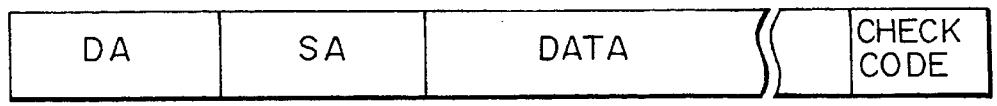
FIG. 4 is a diagram showing a frame format.

Data is transferred on the communication lines (bus lines) of the bus 71 in a frame format. That is, a transmission source unit creates a signal (communication) frame including transmission data which includes a destination address, a transmission source address and an error detection code, and transmits the frame to the bus. The frame is transferred on the communication lines 71 and received by the unit having the same address as the destination address contained in the frame such that the unit executes predetermined operation. FIG. 4 shows a frame format wherein DA denotes the destination address, SA denotes the transmission source address, DATA denotes the transmission data and CHECK CODE denotes the error detection code.

(c) Arrangement of each Unit

• System Control Unit (SCU)

Figure 5:
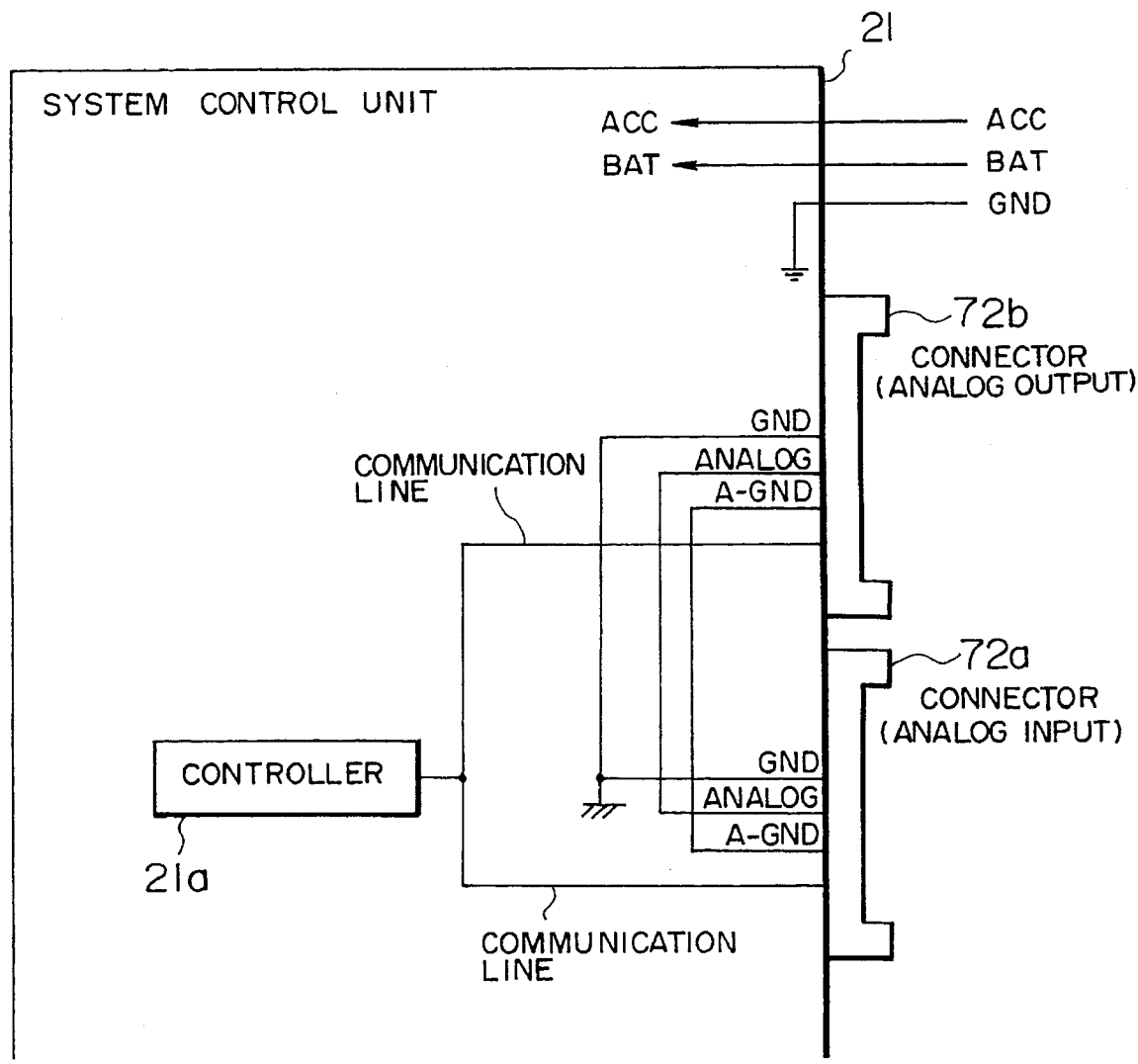
FIG. 5 is a simplified schematic showing the arrangement of a system control unit.

FIG. 5 is a simplified schematic showing the system control unit 21 wherein numeral 72a denotes an analog input side connector and numeral 72b denotes an analog output side connector. Numeral 21a denotes a controller including a microprocessor for centrally controlling the switching of sources, the turning on and off of power and other system operations. All the signals from the previous stage input through the connector 72a are output to the unit of the next stage through the output side connector 72b. Further, data bidirectionally flows on the communication lines, and the controller 21a receives data addressed to it and sends data according to the format shown in FIG. 4 to the bus.

The controller 21a switches the audio sources and image sources through the bus (communication lines) 71 in accordance with a source switch request received from the commanders 11, 12 (FIG. 2) and each source, as well as turns on and off the power supplied to the system as a whole.

• Commander

Figure 6:
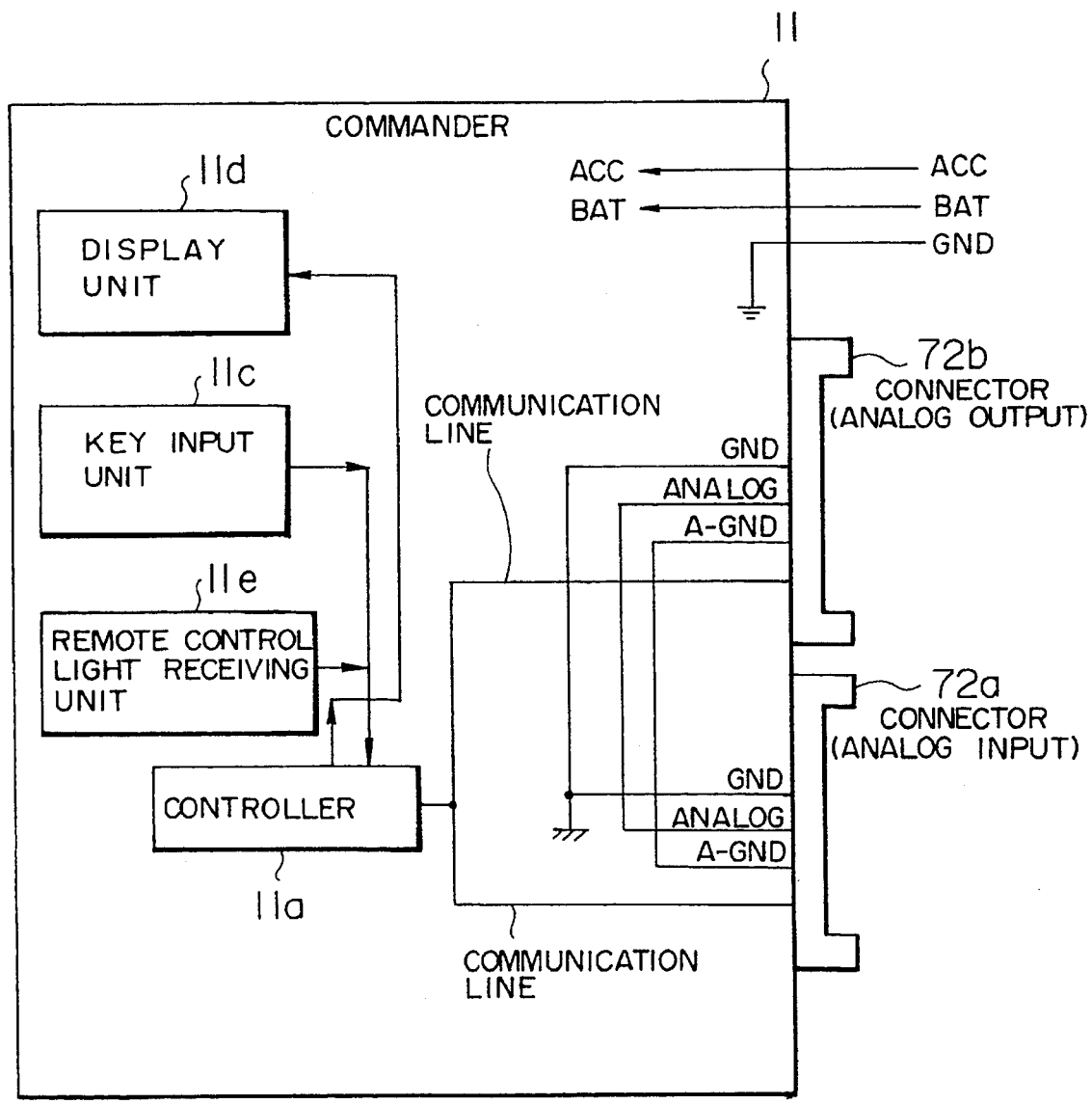
FIG. 6 is a simplified schematic showing the arrangement of a commander.

FIG. 6 is a simplified schematic showing the arrangement of the commander 11, wherein numeral 72a denotes an analog input side connector and numeral 72b denotes an analog output side connector. Numeral 11a denotes a controller including a microprocessor, numeral 11c denotes a key input unit for commanding the activation of each key (switching of each source) and the start and stop of the function characteristic to each source, numeral 11d denotes a display unit, and numeral 11e denotes a remote control light receiving unit.

All the signals input by the connector 72a from the previous stage are output to the unit of the next stage through the output side connector 72b. The controller 11a receives data addressed to it from the bus as well as creates data (data for commanding a source activation request and the execution/stop of the function characteristic to each source) corresponding to key operation and remote control operation in accordance with the format shown in FIG. 4 and sends the data to the bus (communication lines 71).

The commander 11 represents any one of an audio unit commander, an image unit commander, a navigation commander or a commander combining these commanders. Each commander is provided with a source switching key and keys for commanding the respective operations of each unit. For example, the audio unit commander is provided with (1) an AM/FM key, a tape key, a CD key as the source selection keys, (2) a band switch key, a preset key, a seek key as AM/FM keys, (3) a play key, a quick feed/rewind key, Dolby on/off key as tape player keys, (4) a play key, a music selection up/down key as CD player keys, and (5) a ten-digit number pad, a volume up/down key, and a bass/treble key.

• Arrangement View of Head Unit

Figure 7:
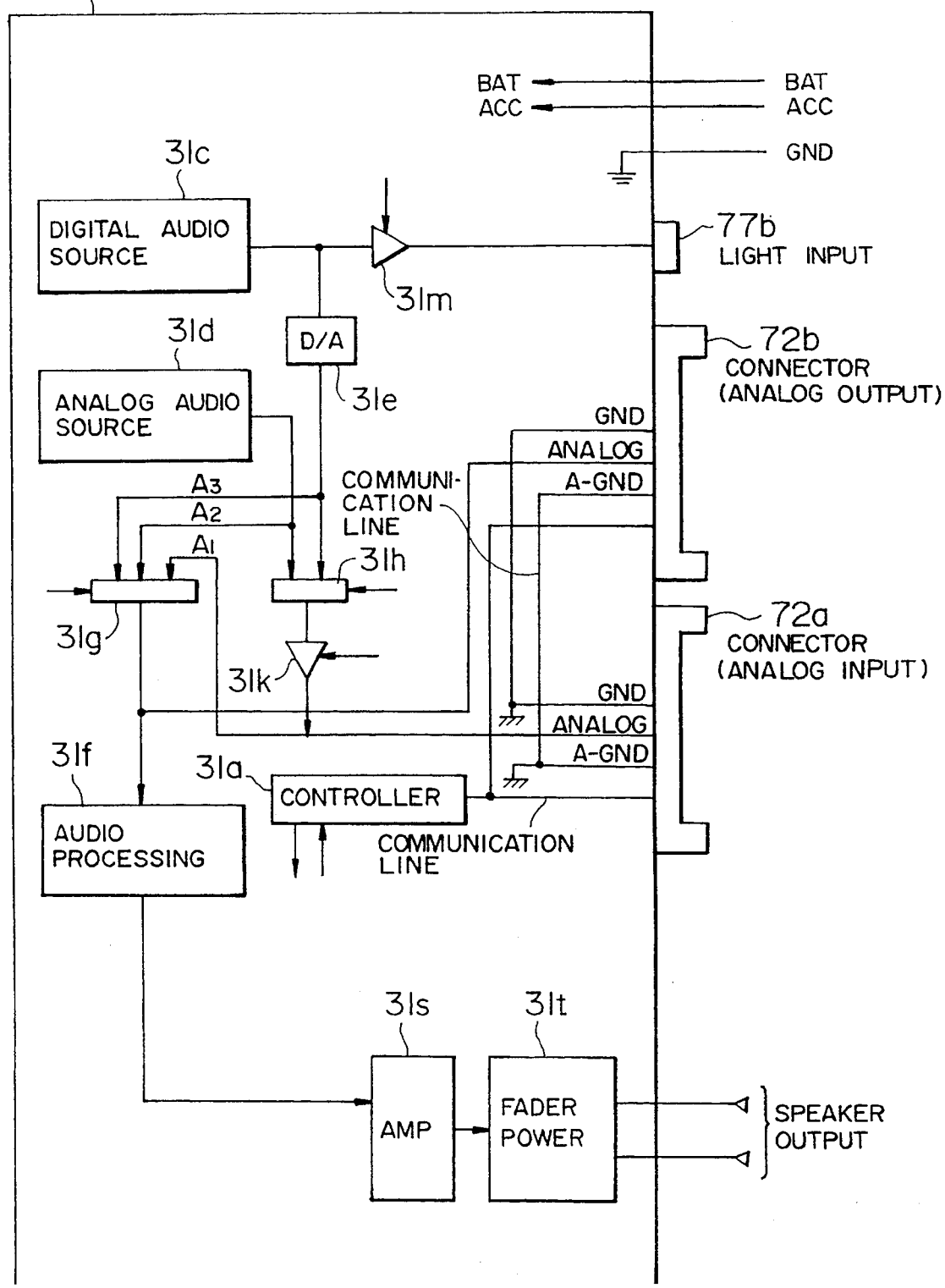
FIG. 7 is a simplified schematic showing the arrangement of a head unit.

FIG. 7 is a simplified schematic showing the arrangement of the head unit (HU) 31 wherein numeral 72a denotes an analog input side connector and numeral 72b denotes an analog output side connector. In the head unit 31, numeral 31a denotes a controller including a microprocessor, numeral 31c denotes a digital audio source (which includes one or more of a CD player, a DAT player, a minidisc player, a DCC player), numeral 31d denotes an analog audio source (which includes one or more of a cassette tape player, an AM/FM tuner), numeral 31e denotes a D/A converter, numeral 31f denotes an audio processing unit, numerals 31g–31h denote selectors, and numerals 31k and 31m denote a mute circuit for removing unnecessary noise and sound resulting from the switching of output. Further, numeral 31s denotes an audio amplifier and numeral 31t denotes a power fader.

When the head unit 31 is used independently, an output from the power fader 31t is input to front and rear speakers mounted on a vehicle. However, when the head unit 31 is assembled to the system shown in FIG. 2, nothing is connected to the output terminal of the power fader 31t.

The selector 31g selects any audio signals of audio signals A1 input from a previous unit through the connector 72a, audio signals A2 output from the analog source 31d and audio signals A3 obtained by subjecting an output from the digital source 31c to D/A conversion under the control of the controller 31a, and sends the selected audio signals to the next unit through connector 72b. For example, when the activation of the analog audio source 31d is commanded through the communication line, the controller 31a selects the audio signals A2 from the analog source 31d and sends them to the next unit. In the same way, when activation of the CD player is commanded, the audio signals A3 output from the D/A converter 31e are selected and sent to the next unit, and when the activation of any audio source is commanded, the audio signals A1 input from the previous unit are selected and sent to the next unit. Further, digital data output from the digital audio source 31c is input to the audio processor 37 through an optical connector 77b.

• Analog Audio Source

Figure 8:
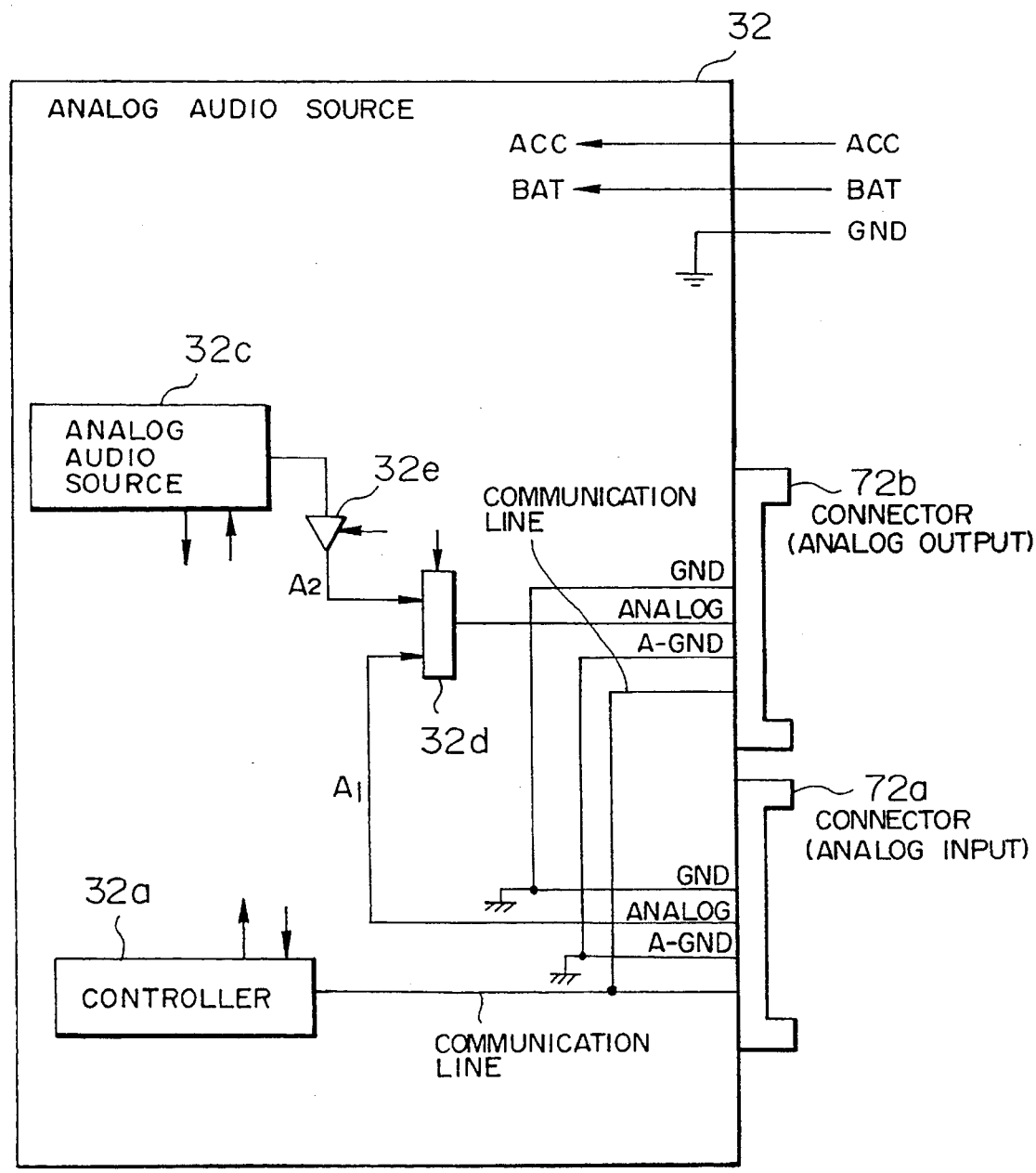
FIG. 8 is a simplified schematic showing the arrangement of an analog/audio source.

FIG. 8 is a simplified schematic showing the arrangement of the analog audio device 32 (such as an analog tape player or an AM/FM tuner), wherein numeral 72a denotes an analog input side connector and numeral 72b denotes an analog output side connector. Numeral 32a denotes a controller including a microprocessor, numeral 32c denotes an analog audio generator, numeral 32d denotes a selector, and numeral 32e denotes a circuit for removing unnecessary sound from the source (inter-station noise of the tuner and sound produced when music is scanned on a tape).

Either analog audio signals A1 received from the previous unit through the connector 72a or audio signals A2 output from the analog audio generator 32c are selected by the selector 32d under the control of the controller 31a and sent to the next unit through connector 72b. For example, when the activation of the analog audio generator 32c is commanded through the communication line, the controller 32a selects the audio signals A2 and sends them to the next unit. On the other hand, when activation of the analog audio generator 32c is not commanded, the audio signals A1 input from the previous unit are selected and sent to the next unit.

• Digital Audio Source

Figure 9:
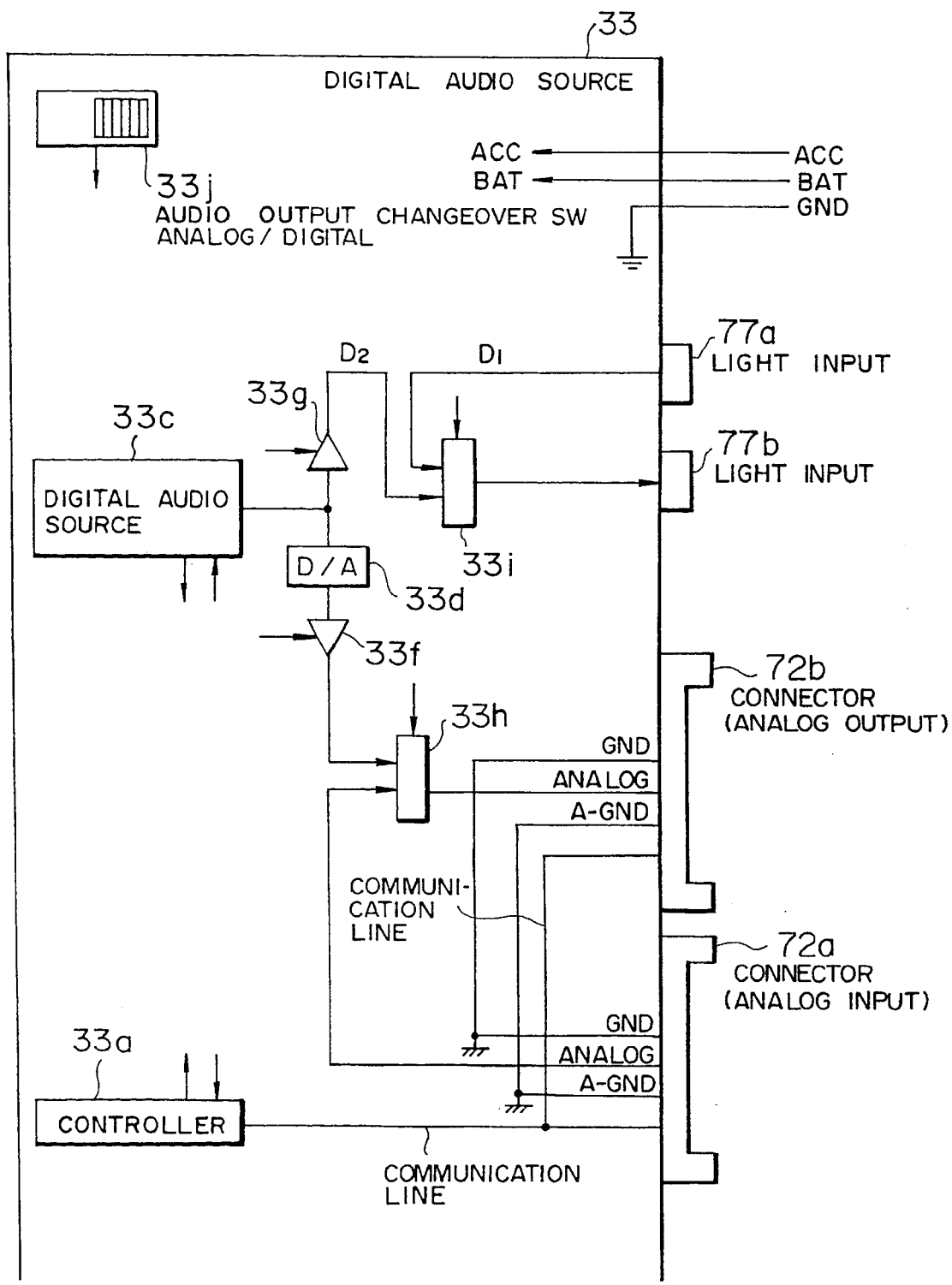
FIG. 9 is a simplified schematic showing the arrangement of a digital audio system.

FIG. 9 is a simplified schematic showing the arrangement of the digital audio device 33 (such as a CD player, a DAT player, a minidisc player, or a DCC player), wherein numeral 72a denotes an analog input side connector, numeral 72b denotes an analog output side connector, numeral 77a denotes an input side optical connector and numeral 77b denotes an output side optical connector.

Numeral 33a denotes a controller including a microprocessor, numeral 33c denotes a digital audio signal generator, numeral 33d denotes a D/A converter, numerals 33f–33g denote circuits for removing unnecessary sound, numerals 33h, 33i denote selectors, and numeral 33j denotes a changeover switch for switching an audio output to digital/analog output.

When the audio output changeover switch 33j selects an analog output, the controller 33a selects either analog audio signals A1 input from a previous audio unit through the connector 72a or analog audio signals A2 output from the D/A converter 33d through the selector 33h. The selected audio signals are then sent to the next unit through connector 72b. On the other hand, when the audio output changeover switch 33j selects a digital output, the controller 33a selects either digital audio signals D1 input from the previous unit through the optical connector 77a or digital audio signals D2 from the digital audio signal generator 33c through the selector 33i. The selected audio signals are then sent to the digital audio source or the audio processor of the next unit through the optical connector 77b.

• Audio Processor

Figure 10:
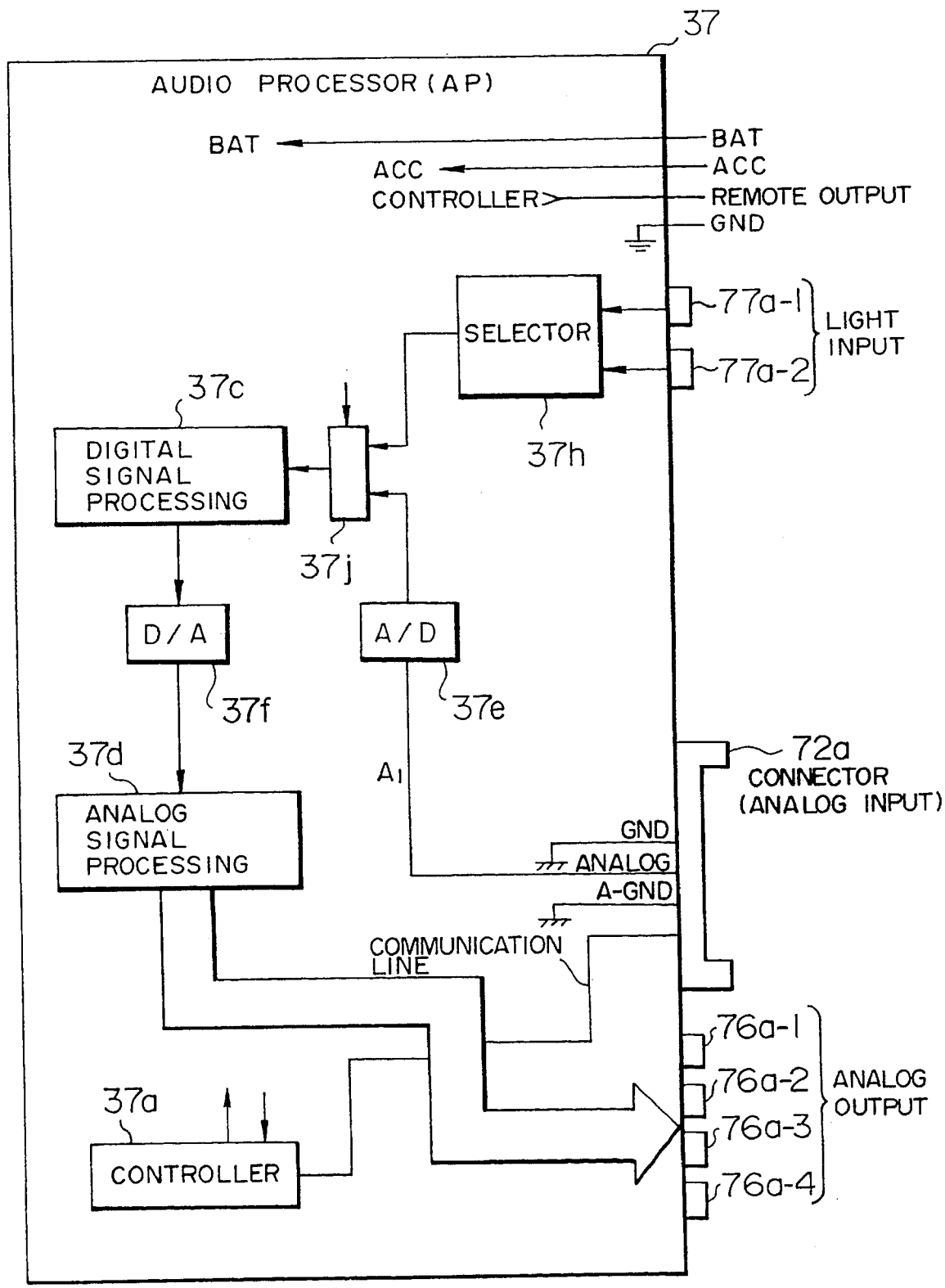
FIG. 10 is a simplified schematic showing the arrangement of an audio processor.

FIG. 10 is a simplified schematic showing the arrangement of the audio processor (AP) 37, wherein numeral 72a denotes an analog side input connector, numerals 76a-1 to 76a-4 denote connectors for inputting audio signals to amplifiers 61, 62 (FIG. 2), and numerals 77a-1 to 77a-2 denote optical connectors for inputting optical signals. Numeral 37a denotes a controller including a microprocessor, numeral 37b denotes a digital signal processing unit, numeral 37d denotes an analog signal processing unit, numeral 37e denotes an A/D converter, numeral 37f denotes a D/A converter, and numerals 37h, 37j denote selectors.

Analog audio signals A1 input from a previous audio unit are input to the A/D converter 37e, converted into a digital signal therein, and then input to the digital signal processing unit 37c through the selector 37j. Further, digital audio signals are input to the digital signal processing unit 37c through the selectors 37h, 37j.

The controller 37a controls each selector, selects audio signals output from the commanded audio source and inputs the selected audio signals to the digital signal processing unit 37c. The digital signal processing unit 37c digitally processes the input audio signals, and the D/A converter 37f converts an output from the digital signal processing unit into analog signals and inputs the signals to the analog audio signal processing unit 37d. The analog signal processing unit 37d subjects the input analog signals to predetermined analog signal processing (for example, volume, front/rear volume ratio, right/left volume ratio and mute control) and inputs the processed signal to the amplifiers 61 and 62.

• TV Tuner

Figure 11:
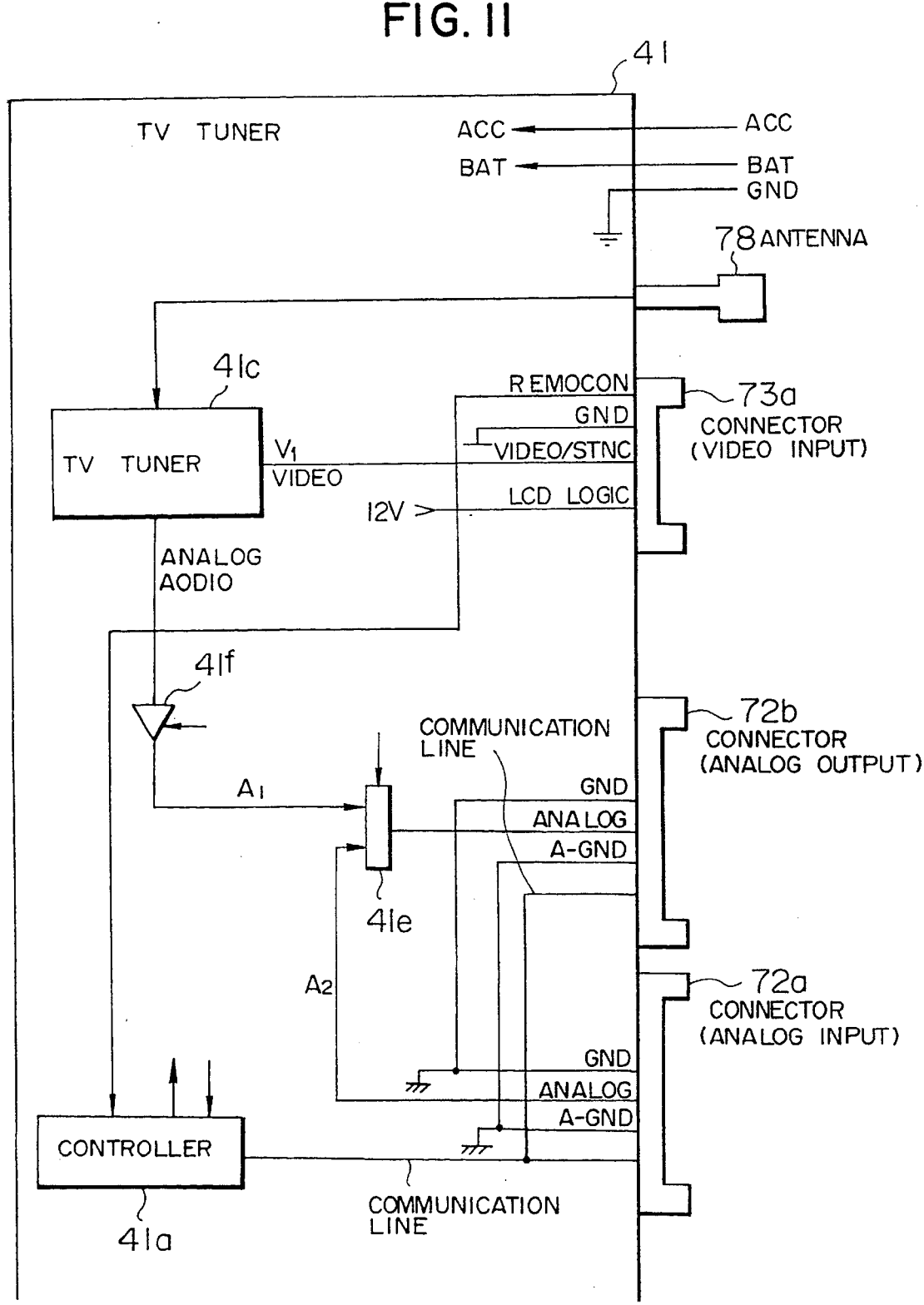
FIG. 11 is a simplified schematic showing the arrangement of a TV tuner.

FIG. 11 is a simplified schematic showing the arrangement of the TV tuner 41, wherein numeral 72a denotes an analog input side connector, numeral 72b denotes an analog output side connector, numeral 73a denotes a connector for outputting video signals as well as receiving a remote control signal, and numeral 78 denotes a TV antenna terminal.

Numeral 41a denotes a controller including a microprocessor, numeral 41c denotes a TV signal selector, numeral 41e denotes a selector, and numeral 41f denotes a circuit for removing unnecessary sound output from the source. The controller 41a controls the selector 41c, selects any audio signals of audio signals A1 - A2 input from the TV tuner and the connector 72a, respectively, and outputs the selected audio signals through the connector 72b. Further, the controller 41a outputs through the connector 73a video signals V1 output from the TV tuner.

• Navigation Unit

Figure 12:
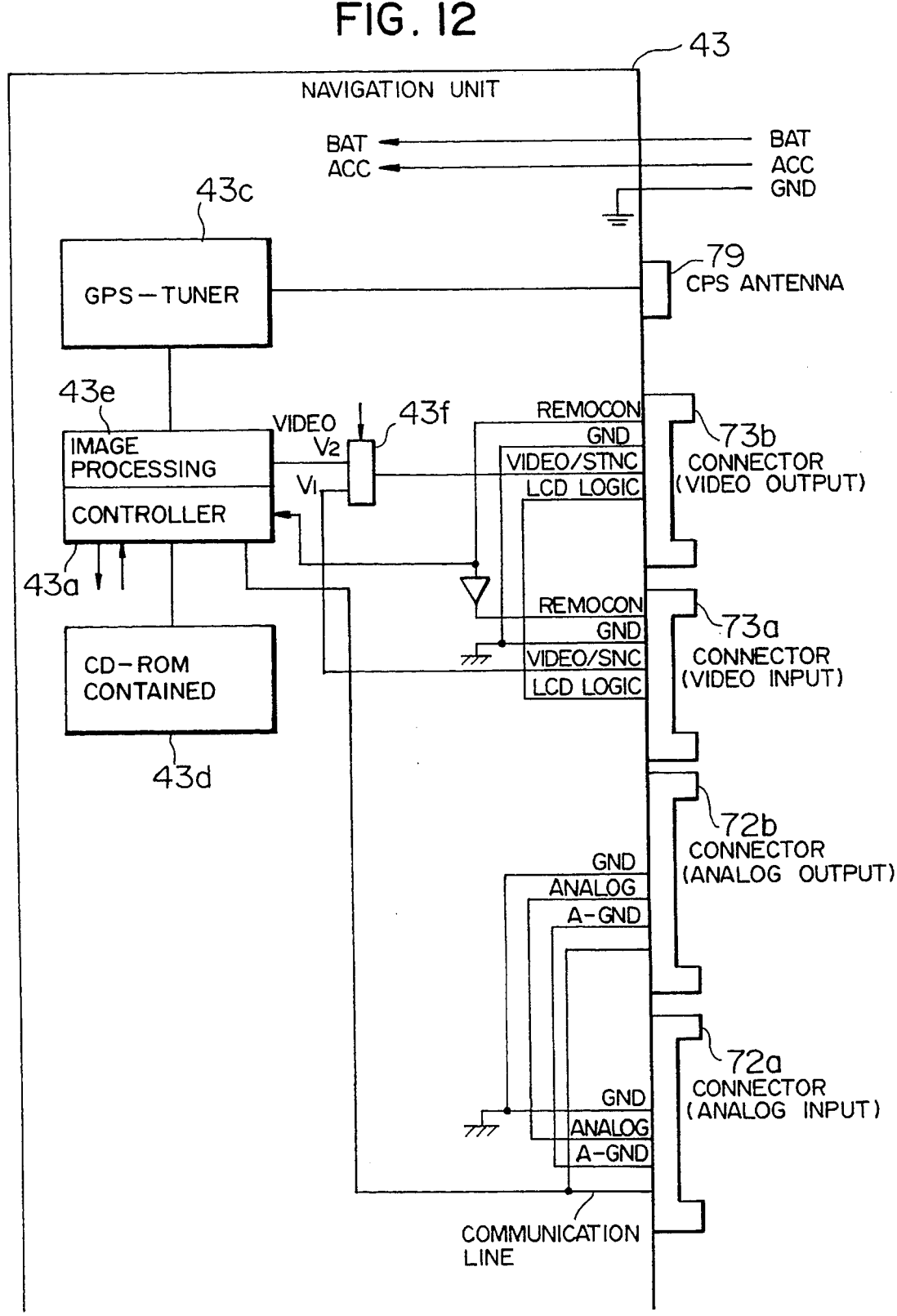
FIG. 12 is a simplified schematic showing the arrangement of a navigation unit.

FIG. 12 is a simplified schematic showing the arrangement of the navigation unit 43, wherein numeral 72a denotes an analog input side connector, numeral 72b denotes an analog output side connector, numerals 73a, 73b denote video signal I/O connectors, and numeral 79 denotes a GPS antenna terminal. In the navigation unit, numeral 43a denotes a controller including a microprocessor, numeral 43c denotes a GPS tuner, numeral 43d denotes a CD-ROM for storing map data, 43e denotes an image creation unit for creating a map image based on the map data read from a CD-ROM, and numeral 43f denotes a selector.

Audio signals input from the connector 72a are output from the connector 72b passing directly through the navigation unit. On the other hand, video signals are selected by the selector 43f and output to the image unit of the next stage from the connector 73b. That is, the controller 43a controls the selector 43f, selects either video signals V1 input from the image unit of the previous unit (TV tuner) and video signals V2 (map image) created by the image processing unit 43e and outputs the selected images through connector 73b.

• Arrangement View of Video Monitor

Figure 13:
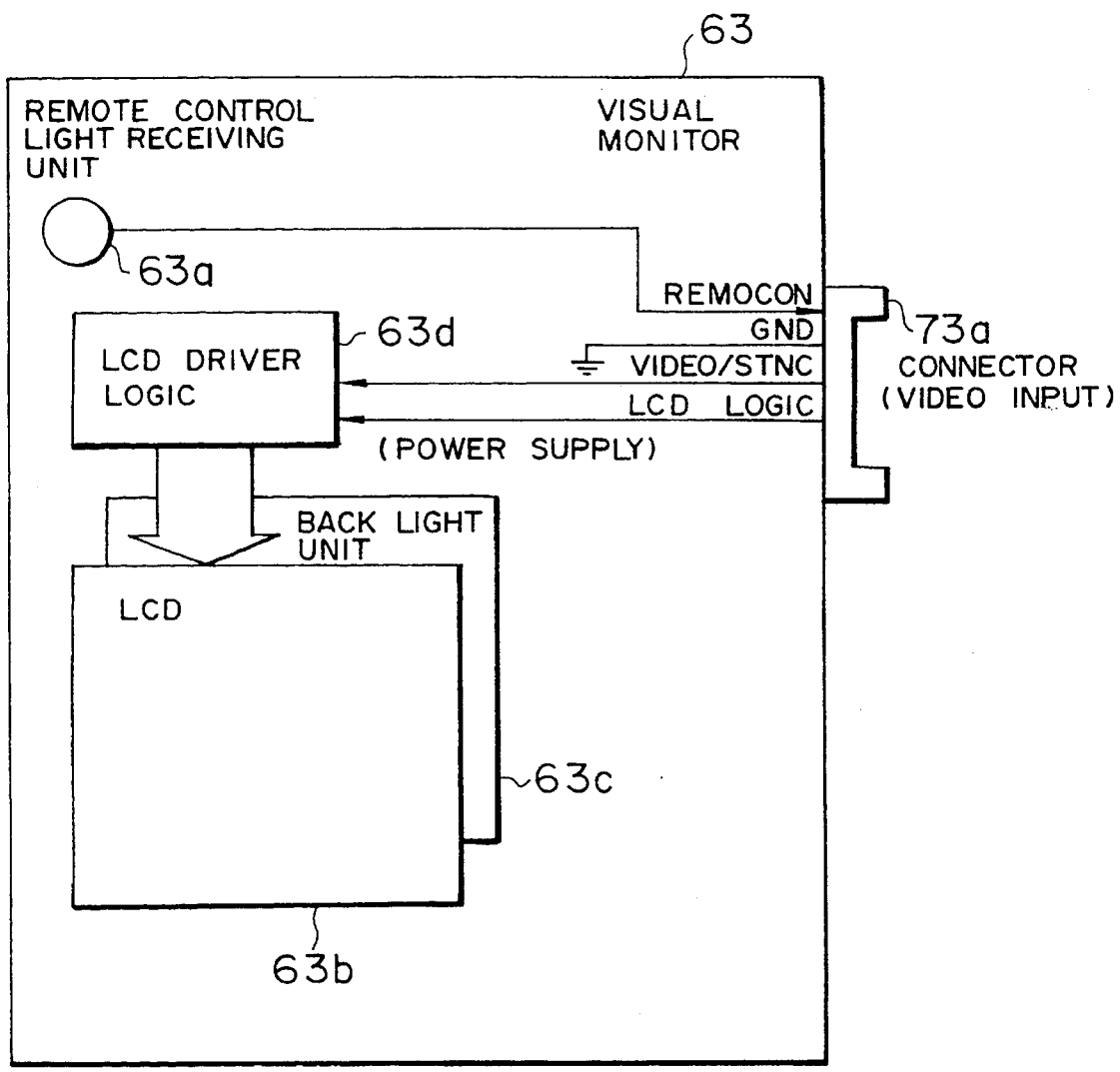
FIG. 13 is a simplified schematic showing the arrangement of a video monitor.

FIG. 13 is a simplified schematic showing the arrangement of the video monitor 63, wherein numeral 73a denotes a connector for inputting video signals and outputting a remote control signal (REMOCON). In the video monitor 63, numeral 63a denotes a remote control light receiving unit, numeral 63b denotes a liquid crystal panel, numeral 63c denotes a back light unit and numeral 63d denotes a liquid crystal drive logic unit.

The video monitor 63 transmits the remote control signal REMOCON received through the remote control light receiving unit 63a to other image units through the connector 73a. In addition, the video monitor 63 displays an image on the liquid crystal panel 63b based on the video signals input from the connector 73a.

(d) Processing Affected by System Control Unit

Processing effected by the system control unit 21 will now be described.

(d-1) Switch of Audio Sources

Figure 14:
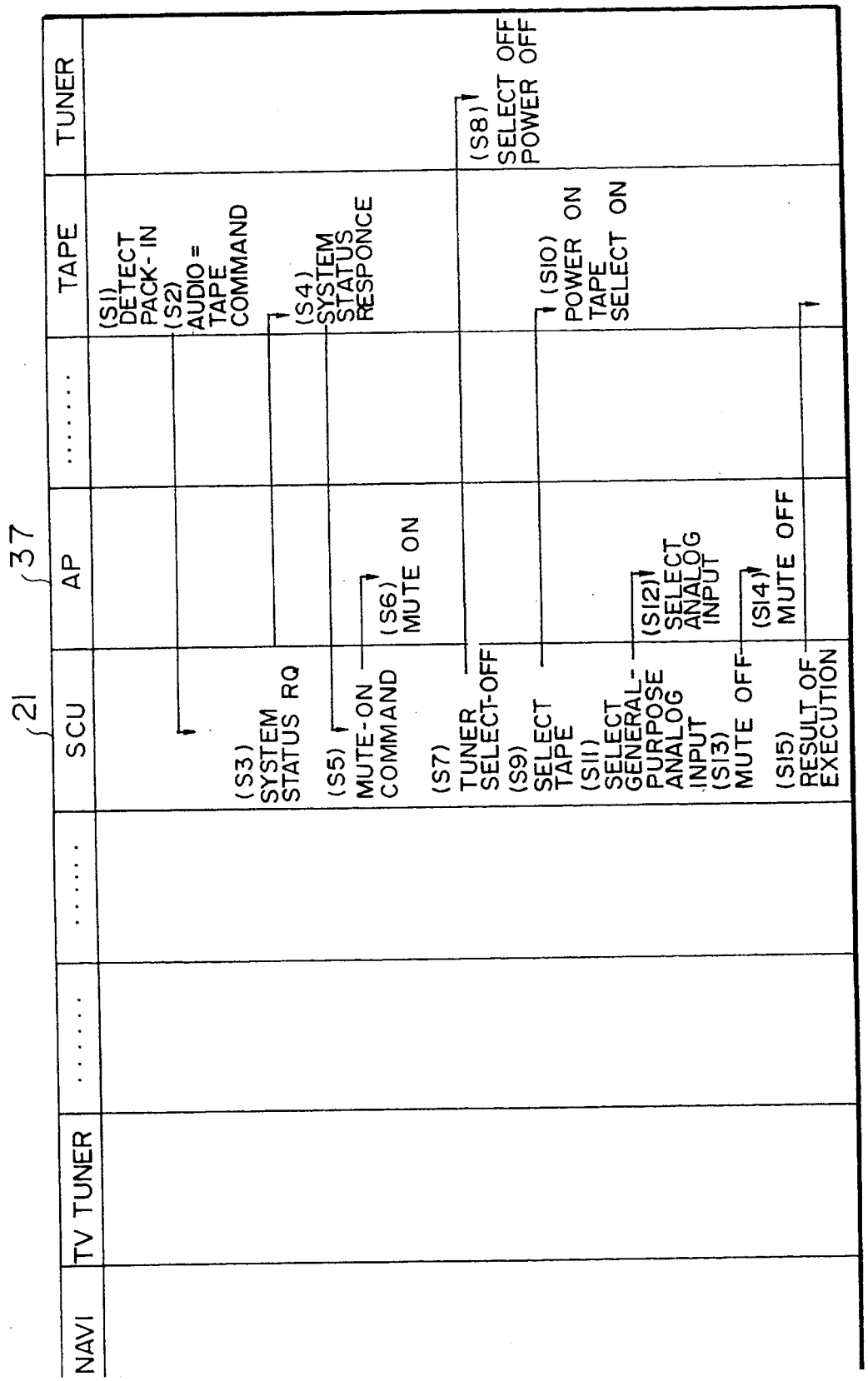
FIG. 14 is a diagram showing a processing sequence when a source is switched from a tuner to a tape.

FIG. 14 is a diagram explaining a processing sequence used when a signal source is switched from a tuner to a cassette tape player.

When a cassette tape is inserted in the tape player while the tuner is in operation (pack-in detection: S1), the tape player sends a request signal (AUDIO=TAPE: S2) to the SCU 21 for switching the audio source to the tape player.

The system control unit 21 then issues a system status request to the tape player in response to the request signal to confirm whether or not the tape player actually is present (S3). When the tape player receives the system status request, it returns a system status response to confirm its presence (S4).

After the confirmation of the presence of the tape player, the system control unit 21 issues a mute-on command to the audio processor (AP) 37 (S5). On receiving the mute-on command, the audio processor turns on the mute (S6).

Thereafter, the system control unit 21 issues a tuner select-off command to the tuner (S7), and the tuner turns off its power in response to the command. Next, the system control unit 21 issues a tape select command to the tape player (S9). The tape player turns on its power in response to the command and starts to play (S10).

Thereafter, the system control unit 21 issues an analog input select command to the audio processor 37 (S11). The audio processor 37 selects signals input from the analog connector 72a in response to the select command (S12). Next, the system control unit 21 issues a mute-off command to the audio processor 37 (S13). On receiving the mute-off command, the audio processor 37 turns off the mute and inputs audio signals from the tape player to the amplifier to output sound from the speakers (S14). Thereafter, the system control unit 21 signals the tape player which transmitted the source switch request (S15) of the successful completion of the source switching process. When the source switching process fails for any reason, the system control unit 21 transmits a NG (not good) signal to the source switch requester, whereas when the switching of the source is successful, it transmits an OK signal.

Although the aforesaid describes a case in which the source switch request is issued from the audio source on the detection of the insertion of the tape cassette, it is of course possible for the commander to issue the source switch request. In this case, upon receiving the source switch request from the commander, the system control unit SCU switches the source according to the processing sequence shown in FIG. 14 and finally returns the result of execution to the commander.

(d-2) Switch of Video Signal Sources

Figure 15:
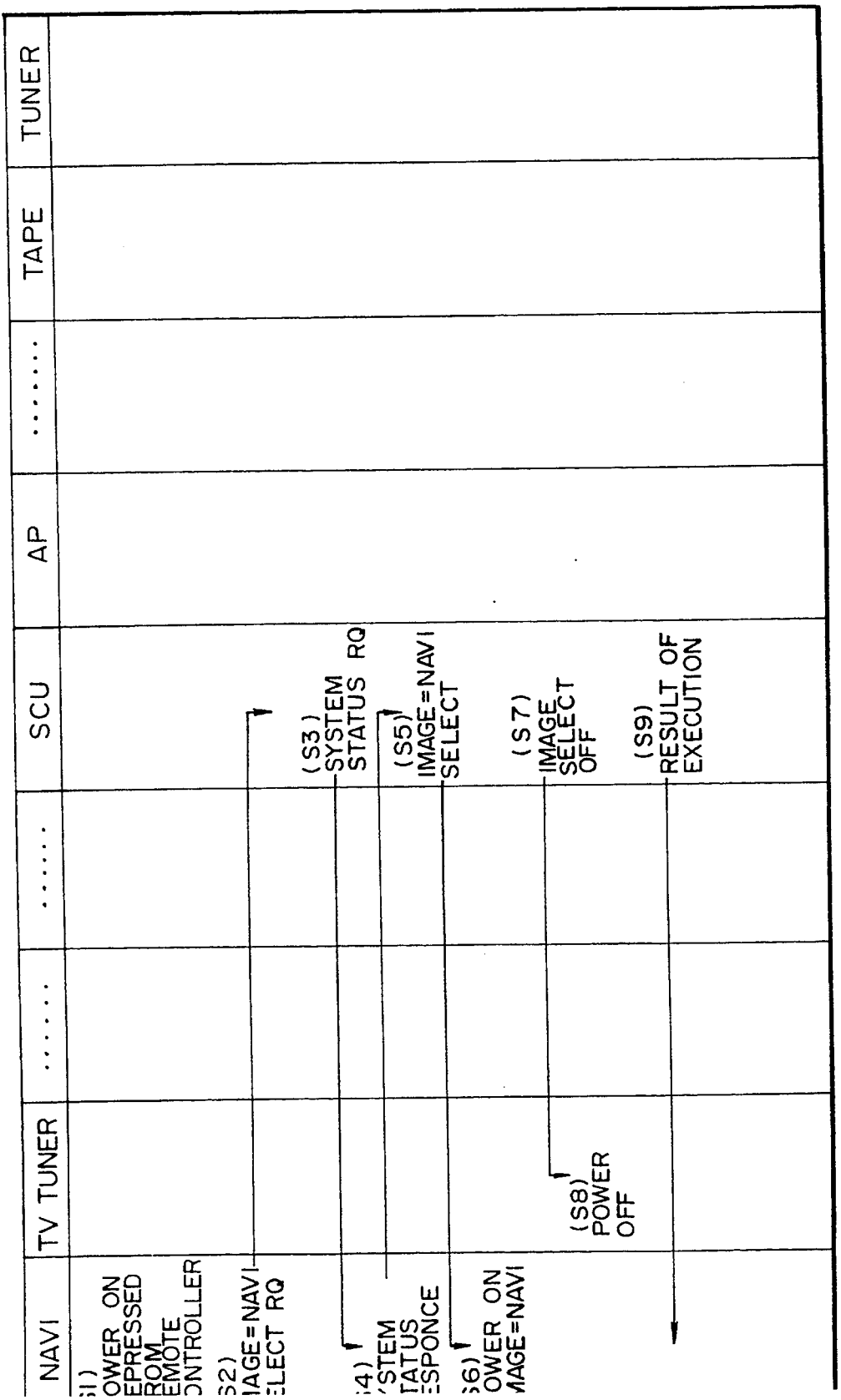
FIG. 15 is a diagram showing a processing sequence when a source is switched from a TV to a NAVI.

FIG. 15 is a diagram explaining a processing sequence when an image source is switched from the TV tuner to the navigation unit. When the "navigation power on" key of the remote controller 64 is pressed while an image from the TV tuner is displayed on the monitor (S1), the navigation unit 43 detects the key depression through a remote control signal and sends a request command (NAVI select command: S2) to the SCU 21 for switching the image source to the navigation unit.

On receiving the above request command, the system control unit 21 issues a system status request to the navigation unit 43 to confirm whether the navigation unit actually is present or not (S3). On receiving the system status request, the navigation unit 43 returns a system status response to confirm its presence (S4).

When the system control unit 21 confirms the presence of the navigation unit, it issues an image=NAVI select command to the navigation unit (S5). The navigation unit 43 turns on its power in response to the command (S6). Thereafter, the system control unit 21 issues an image select-off command to the TV tuner (S7) and the TV tuner turns off its power in response to the command (S8). Next, the system control unit 21 signals the navigation unit which transmitted the source switch request (S9) of the successful completion of the source switching process.

Figure 16:
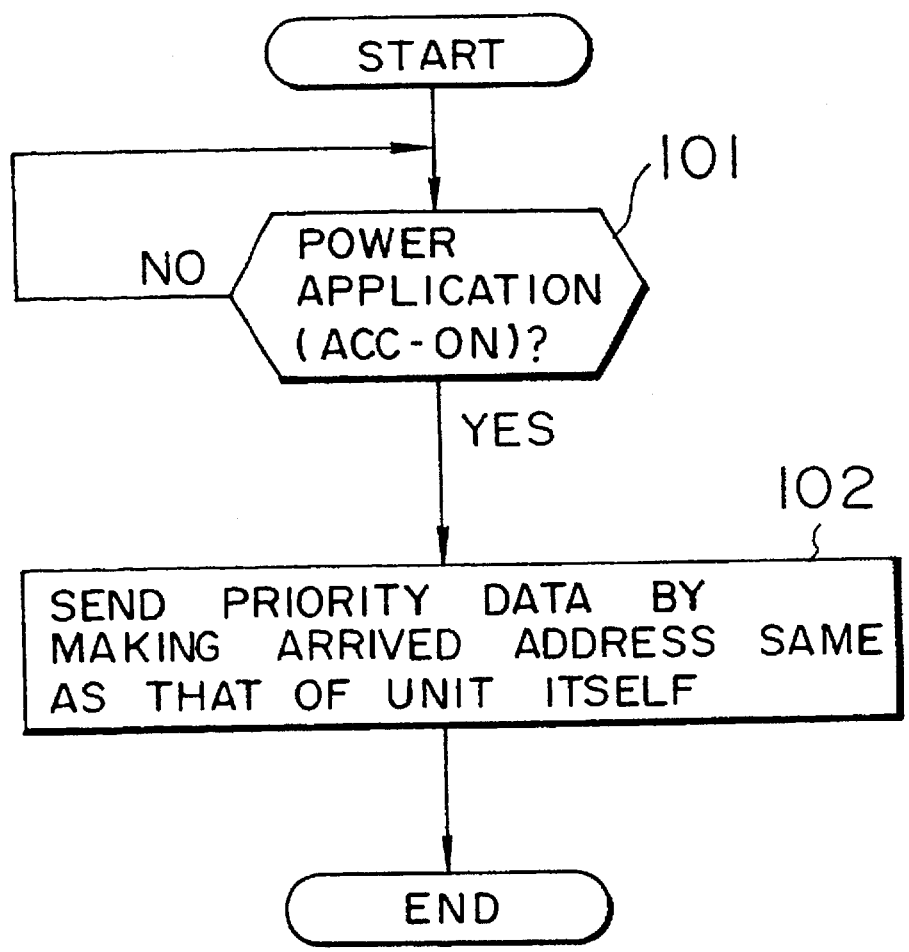
Figure 17:
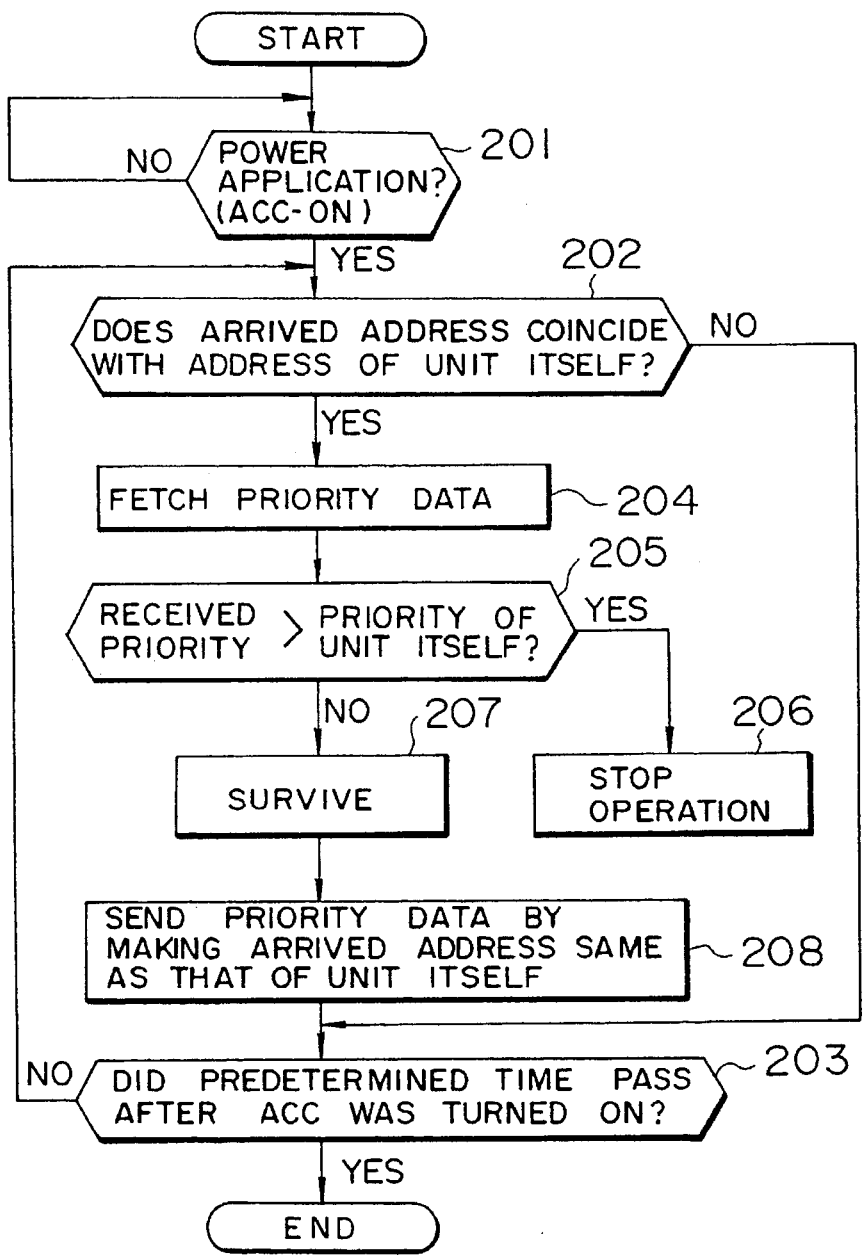
FIG. 17 is a flowchart showing when the power supply to a slave (source) is momentarily interrupted and then restored.

(e) Process for Causing Only One of Two Units having the Same Address to Remain Active FIG. 16 and FIG. 17 are flowcharts showing a process for causing only one of two units having the same address to be activated. When the power supply is turned on, that is, when ACC is turned on (step 101), each unit assembles a frame including a destination address, which coincides with its own address, and which includes preset priority data and then transmits the frame on the bus line within a predetermined time period (step 102).

Further, when the ACC is turned on (201), each unit checks whether the destination address of a frame on the bus line coincides with its own address or not (step 202), and when the destination address does not coincide with its address, each unit checks whether a time passed after the ACC is turned on exceeds a preset time (step 203). When the time does not exceed the set time, the process returns to step 202.

On the other hand, when the destination address of the frame on the bus line coincides with the address of the unit, the priority data included in the frame is received by the unit (step 204).

Next, each unit compares the received priority value with its own priority preset value to it (step 205). When the priority value of the unit is lower than the received priority value, the unit stops its operation (deactivates) and thereafter does not respond to frames having destination addresses equal to its own address (step 206). When the priority value of the unit is higher than the received priority value, the unit survives remaining responsive to information received on the bus (207), makes the destination address coincide with its own address, and sends priority data to the bus line so that the operation of the unit having the lower priority is securely stopped (step 208). Thereafter, each unit checks whether a time passed after the ACC is turned on has exceeded the set time or not (step 203), and when the former time does not exceed the latter time, the unit repeats the processes at step 202 and the steps following it, and when the former time exceeds the latter time, the survival process is ended.

With the above processing, the unit having the highest priority of the units having the same address survives and the operation of the other units is stopped.

Figure 18:
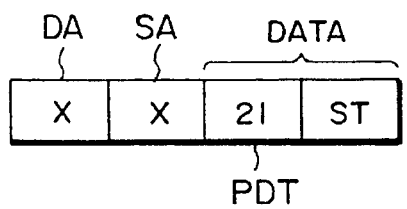
FIG. 18 is a flowchart showing when the power supply to a master (control unit) is momentarily interrupted and then restored.

FIG. 18 is a view explaining a frame including priority data, wherein DA denotes a destination address, SA denotes a transmission source address, PDT denotes identifying data for identifying priority data, and ST denotes priority data. A unit which generates a frame having a higher priority number has higher priority and survives in the survival processing of units having the same address.

Note, in the above description, although the survival processing of units having the same address is executed when the ACC is turned on, there is a case that a new unit is connected to the bus while the system is in operation and priority data is sent from the new unit at that time. In such a case, the survival processing is executed by identifying the priority data by the identifying data PDT.

(f) Another Arrangement of Audio/Video System

Figure 19:
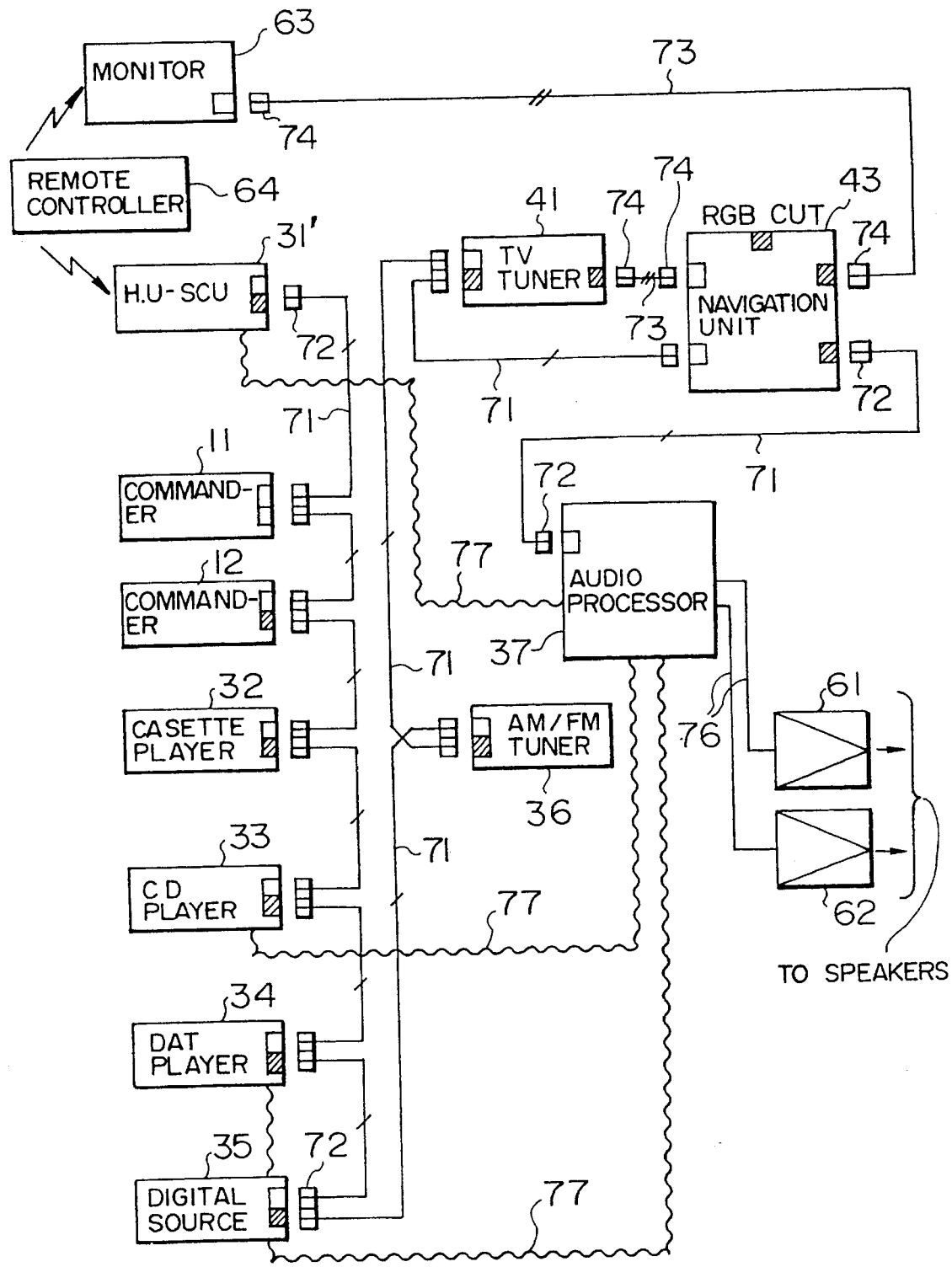
FIG. 19 is a block diagram showing the overall arrangement of a second audio/video system in accordance with the present invention.
Figure 20A:
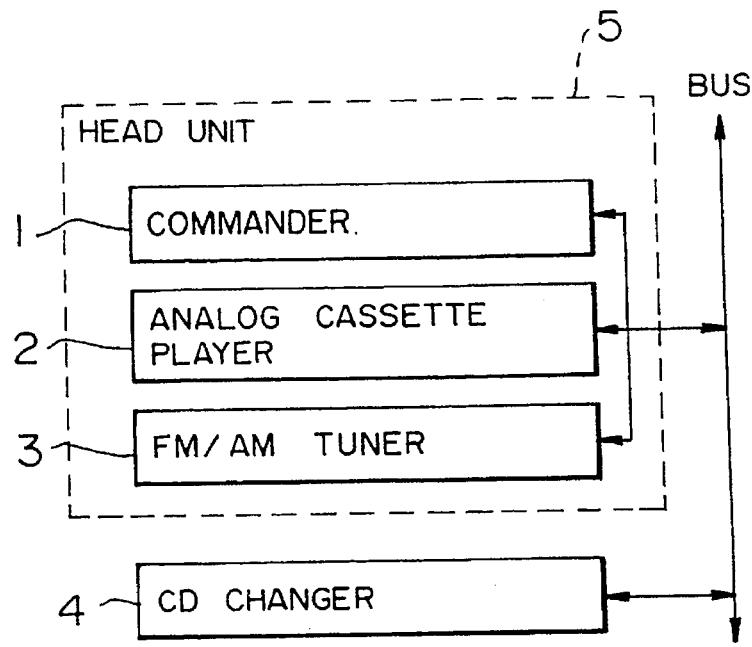
FIGS. 20A and 20B are diagrams showing a prior art system.
Figure 20B:
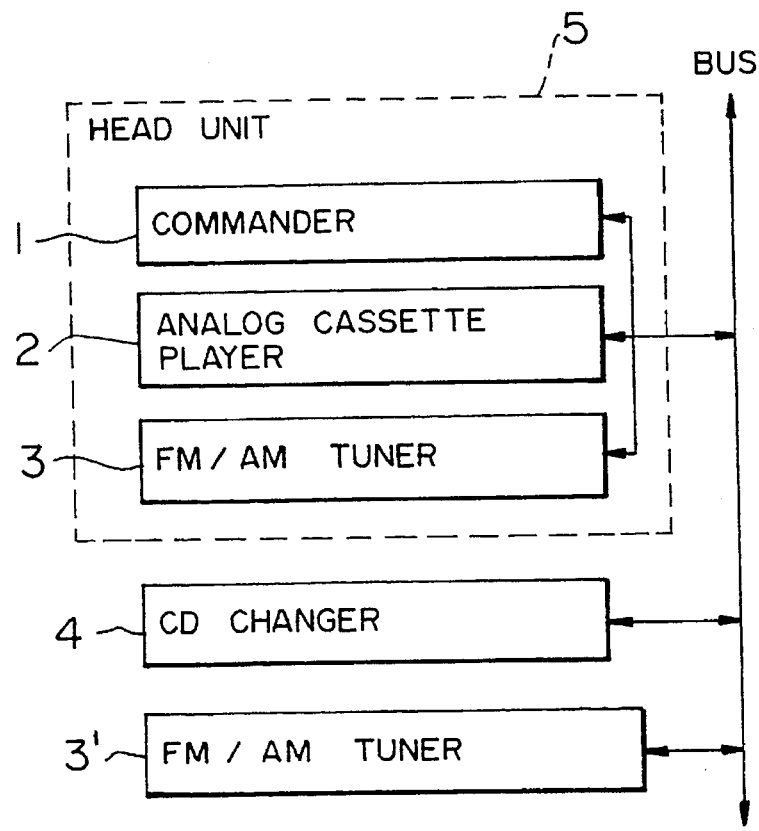

The audio/video system of FIG. 2 has the system control unit 21 which is provided as a separate unit. The circuitry of the system control unit 21 is partially the same as that of the commander 11 and the head unit 31. Thus, it is possible to integrate the function of the system control unit 21 with the controllers 11a, 31a of the commander 11 and the head unit 31. FIG. 19 shows such an audio/video system in which the function of the system control unit is integrated with the head unit 31 (or the commander 11). The same numerals as used in FIG. 2 are used to denote the same elements in FIG. 19. Numeral 31' denotes a head unit also serving as a system control unit (HU.SCU). Note, the commander can be also contained in the head unit.

Although the present invention is described with reference to certain embodiments, it is not limited thereto. That is, although FIG. 2 and FIG. 19 show embodiments in which the system includes a considerable number of units, other embodiments need not include all of these units. Further, other units not shown in the disclosed embodiments may be included. Various other modifications can be made which fall within the scope of the present invention.

We claim:

1. An audio/video device connectable to a communication bus, the bus including a communication line and an audio signal line, a plurality of such audio/video devices; being serially interconnected through the bus, the audio/video device comprising:

first and second connectors adapted for coupling to first and second ends of the bus;

a communication line segment extending between the first and second connectors;

an audio line segment extending between the first and second connectors;

a memory unit storing priority value and address data; and a controller connected to the communication line segment and to the memory unit, the controller including means for generating a communication frame on the communication line segment such that the communication frame is transmitted on the communication line of the bus, the frame including transmission and destination addresses which coincide with the stored address data, and transmission information which coincides with the stored priority value.

2. An audio/video device according to claim 1, wherein the audio/video device is one of an audio signal generating unit and a video signal generating unit.

3. An audio/video device according to claim 1, wherein the frame further includes transmission data and an error detection code.

4. An audio/video device according to claim 3, wherein the transmission data includes identification data, for identifying the priority value, and the priority value.

5. An audio/video device according to claim 1, wherein the audio line segment includes a first portion connected to the first connector and a second portion connected to the second connector;

wherein the audio/video device further comprises:

an audio signal source;

a selector connected to the audio signal source and connected between the first and second portions of the audio line segment; and wherein the controller further includes:

means for detecting communication frames transmitted on the bus, means for determining if the destination address of the received communication frames coincides with the address data stored in the memory unit, means for comparing priority value of a received communication frame with the priority value stored in the memory unit when the destination address of the received communication frame coincides with the stored address data, and means for generating a selector control signal for controlling the selector to connect the audio signal source to the second audio signal segment when the priority value of the received communication frame coincides with the stored priority value.

6. An audio/video device according to claim 5, wherein the controller further includes means for generating a second selector control signal for controlling the selector to connect the first and second portions of the audio signal segment when the stored priority value is lower than the priority value of the received communication frame.

7. An audio/video device according to claim 5, wherein when the stored priority value is greater than the priority value of the received communication frame, the controller causes the means for transmitting to retransmit the generated communication frame.

8. An audio/video device according to claim 1, wherein the controller includes a timer for calculating a predetermined period after power is supplied to the communication system, the controller ignoring communication frames containing priority value after the predetermined period has expired.

9. A communication system including a bus and a plurality of audio/video devices serially connected to the bus, the bus including a communication line and an audio signal line, each audio/video device being one of an audio signal generating unit and a video signal generating unit, each audio/video device comprising:

first and second connectors adapted for coupling to first and second ends of the bus;

a communication line segment extending between the first and second connectors;

an audio line segment including a first portion connected to the first connector and a second portion connected to the second connector;

an audio signal source;

a selector connected to the audio signal source and connected between the first and second portions of the audio line segment;

a memory unit for storing priority value and address data pertaining to the audio/video device; and a controller connected to the communication line segment and to the memory unit, the controller including:

means for generating a communication frame including transmission and destination addresses which coincide with the stored address data, and transmission information which coincides with the stored priority value, means for transmitting the communication frame on the communication line segment such that the communication frame is transmitted on the communication line of the bus, means for detecting communication frames transmitted on the bus, means for determining if the destination address of the received communication frames coincides with the address data stored in the memory unit, means for comparing priority value of a received communication frame with the priority value stored in the memory unit when the destination address of the received communication frame coincides with the stored address data, means for generating a selector control signal for controlling the selector to connect the audio signal source to the second audio signal segment when the priority value of the received communication frame coincides with the stored priority value, and means for generating a second selector control signal for controlling the selector to connect the first and second portions of the audio signal segment when the stored priority value is lower than the priority value of the received communication frame.

10. A communication system according to claim 9, wherein the information in the generated communication frame includes transmission data and an error detection code.

11. A communication system according to claim 10, wherein the transmission data of the frame includes identification data, for identifying priority value, and the priority value.

12. An audio/video device according to claim 9, wherein when the stored priority value is higher than the priority value of the received communication frame, the controller causes the means for transmitting to retransmit the generated communication frame.

13. A communication system according to claim 9, wherein the controller includes a timer for calculating a predetermined period after power is supplied to the communication system, the controller ignoring communication frames containing priority value after the predetermined period has expired.

14. A method for disabling all but one of a plurality of audio/video devices having a common address in a communication system, the plurality of audio/video devices being serially connected to the bus, the bus including a communication line and an audio signal line, each audio/video device comprising:

first and second connectors adapted for coupling to first and second ends of the bus, a communication line segment extending between the first and second connectors, an audio line segment including a first portion connected to the first connector and a second portion connected to the second connector, an audio signal source, a selector connected to the audio signal source and connected between the first and second portions of the audio line segment, wherein the respective audio/video devices communicate by transmitting communication frames on the communication line of the bus, each communication frame including a transmission source address, a destination address and transmission information, the method comprising the steps of:

storing predetermined address data and priority value in each of the audio/video devices; and when power is applied to the communication system, causing each audio/video device to generate and transmit a communication frame including a destination address which coincides with the stored address data and transmission information which includes the stored priority value.

15. The method according to claim 14, further comprising the steps of:

causing each audio/video device to detect transmitted communication frames, causing each audio/video device to compare the detected communication frames with its stored address data, and, if the destination address coincides with the stored address of an audio/video device, comparing the received priority value with the stored priority value and deactivating the audio/video device if the received priority value is greater than the stored priority value.

16. The method according to claim 14, wherein each of the communication frames include an error detection code.

17. The method according to claim 15, wherein when the received priority value is less than the stored priority value, retransmitting the communication frame including the destination address which coincides with the stored address data and transmission information which includes the stored priority value.

18. The method according to claim 15, further comprising receiving the communication frames containing priority value only during a predetermined time after the step of supplying power.

* * * * *

UNITED STATES PATENT AND TRADEMARK OFFICE
CERTIFICATE OF CORRECTION

PATENT NO. : 5,574,514
DATED : November 12, 1996
INVENTOR(S) : Tanihira et al.

It is certified that error appears in the above-indentified patent and that said Letters Patent is hereby corrected as shown below:

<u>Title Page</u>

In column 1, line 3, under "Inventors" replace "Tadahi Tanihira" with --Tadashi Tanihira--.

Signed and Sealed this

Fifteenth Day of September, 1998

Attest:

BRUCE LEHMAN

*Attesting Officer*  *Commissioner of Patents and Trademarks*